(12) United States Patent
Costa

(10) Patent No.: US 10,205,980 B2
(45) Date of Patent: Feb. 12, 2019

(54) METHOD AND SYSTEM OF PROCESSING IMAGE SEQUENCES

(71) Applicant: AT&T INTELLECTUAL PROPERTY I, LP, Atlanta, GA (US)

(72) Inventor: Pierre Costa, Leander, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 73 days.

(21) Appl. No.: 15/043,700

(22) Filed: Feb. 15, 2016

(65) Prior Publication Data

US 2016/0165272 A1   Jun. 9, 2016

Related U.S. Application Data

(60) Continuation of application No. 14/485,284, filed on Sep. 12, 2014, now Pat. No. 9,294,804, which is a
(Continued)

(51) Int. Cl.
*H04N 21/236* (2011.01)
*H04N 21/43* (2011.01)
(Continued)

(52) U.S. Cl.
CPC ... *H04N 21/23611* (2013.01); *H04N 7/26244* (2013.01); *H04N 7/26941* (2013.01); *H04N 7/50* (2013.01); *H04N 19/115* (2014.11); *H04N 19/152* (2014.11); *H04N 19/169* (2014.11); *H04N 19/176* (2014.11); *H04N 19/188* (2014.11); *H04N 19/23* (2014.11); *H04N 19/40* (2014.11); *H04N 19/61* (2014.11); *H04N 19/88* (2014.11); *H04N 21/2343* (2013.01); *H04N 21/2383* (2013.01); *H04N 21/2385* (2013.01); *H04N 21/23406* (2013.01); *H04N 21/23439* (2013.01); *H04N 21/23605* (2013.01);
(Continued)

(58) Field of Classification Search
CPC .. H04N 7/50; H04N 7/26244; H04N 7/26941; H04N 21/4305
See application file for complete search history.

(56) References Cited

U.S. PATENT DOCUMENTS 5,159,447 A   10/1992   Haskell et al.
5,172,413 A   12/1992   Bradley et al.
(Continued)

OTHER PUBLICATIONS

"International Search Report for PCT/US2003/40186", dated Oct. 6, 2004, 3 pages.

*Primary Examiner* — Shawn S An
(74) *Attorney, Agent, or Firm* — Guntin & Gust, PLC; Joseph Hrutka

(57) ABSTRACT

A system or method for processing a variable bit rate representation of an image sequence can include segmenting a variable bit rate representation of an image sequence into a plurality of segments and creating a second representation of the image sequence where a block of information from a first segment of the plurality of segments is interlaced with blocks of information of a second segment of the plurality of segments. The second representation of the image sequence can include a fragment header indicating the block of information of the first segment of the plurality of segments interlaced with the blocks of information of the second segment of the plurality of segments.

20 Claims, 5 Drawing Sheets

Related U.S. Application Data continuation of application No. 13/431,656, filed on Mar. 27, 2012, now Pat. No. 8,861,612, which is a continuation of application No. 12/268,228, filed on Nov. 10, 2008, now Pat. No. 8,165,218, which is a continuation of application No. 11/208,078, filed on Aug. 19, 2005, now Pat. No. 7,450,644, which is a continuation of application No. 10/346,727, filed on Jan. 16, 2003, now Pat. No. 7,075,990, said application No. 13/431,656 is a continuation-in-part of application No. 12/367,161, filed on Feb. 6, 2009, now Pat. No. 8,218,647, which is a continuation of application No. 11/394,753, filed on Mar. 31, 2006, now Pat. No. 7,539,249, which is a continuation of application No. 10/893,196, filed on Jul. 16, 2004, now Pat. No. 7,054,369, which is a division of application No. 09/942,260, filed on Aug. 28, 2001, now Pat. No. 6,970,512.

(51) Int. Cl.

| | |
|---|---|
| *H04N 19/61* | (2014.01) |
| *H04N 19/176* | (2014.01) |
| *H04N 19/40* | (2014.01) |
| *H04N 21/2343* | (2011.01) |
| *H04N 21/238* | (2011.01) |
| *H04N 21/2662* | (2011.01) |
| *H04N 19/169* | (2014.01) |
| *H04N 19/115* | (2014.01) |
| *H04N 19/152* | (2014.01) |
| *H04N 19/23* | (2014.01) |
| *H04N 19/88* | (2014.01) |
| *H04N 21/234* | (2011.01) |
| *H04N 21/2383* | (2011.01) |
| *H04N 21/2385* | (2011.01) |
| *H04N 21/434* | (2011.01) |
| *H04N 21/44* | (2011.01) |
| *H04N 19/13* | (2014.01) |
| *H04N 19/91* | (2014.01) |
| *H04N 19/132* | (2014.01) |

(52) U.S. Cl.
CPC ... *H04N 21/23805* (2013.01); *H04N 21/2662* (2013.01); *H04N 21/4305* (2013.01); *H04N 21/4343* (2013.01); *H04N 21/4346* (2013.01); *H04N 21/44004* (2013.01); *H04N 19/13* (2014.11); *H04N 19/132* (2014.11); *H04N 19/91* (2014.11)

(56) References Cited

U.S. PATENT DOCUMENTS

| | | | |
|---|---|---|---|
| 5,208,665 A | 5/1993 | McCalley et al. | |
| 5,371,532 A | 12/1994 | Gelman et al. | |
| 5,534,937 A | 7/1996 | Zhu et al. | |
| 5,557,317 A | 9/1996 | Nishio et al. | |
| 5,621,464 A | 4/1997 | Teo et al. | |
| 5,877,812 A | 4/1999 | Krause et al. | |
| 5,898,456 A | 4/1999 | Wahl | |
| 5,901,149 A * | 5/1999 | Itakura | H04N 21/23106 341/51 |
| 5,929,916 A * | 7/1999 | Legall | H04N 19/176 375/240.05 |
| 5,940,594 A | 8/1999 | Ali et al. | |
| 5,956,088 A | 9/1999 | Shen et al. | |
| 5,966,162 A | 10/1999 | Goode et al. | |
| 5,966,387 A * | 10/1999 | Cloutier | H04N 21/4305 370/516 |
| 5,987,621 A | 11/1999 | Duso et al. | |
| 5,991,306 A | 11/1999 | Burns et al. | |
| 6,011,598 A * | 1/2000 | Tsuji | H04N 21/23406 375/240.26 |
| 6,040,866 A | 3/2000 | Chen et al. | |
| 6,044,396 A | 3/2000 | Adams | |
| 6,091,776 A | 7/2000 | Linzer | |
| 6,100,940 A | 8/2000 | Dieterich | |
| 6,151,360 A | 11/2000 | Kato et al. | |
| 6,181,711 B1 * | 1/2001 | Zhang | H04N 21/23614 370/468 |
| 6,192,075 B1 | 2/2001 | Jeng et al. | |
| 6,201,536 B1 | 3/2001 | Hendricks et al. | |
| 6,233,278 B1 | 5/2001 | Dieterich | |
| 6,477,595 B1 | 11/2002 | Cohen et al. | |
| 6,490,273 B1 | 12/2002 | DeNap et al. | |
| 6,529,552 B1 * | 3/2003 | Tsai | H04N 19/103 375/240.03 |
| 6,564,380 B1 | 5/2003 | Murphy | |
| 6,594,826 B1 | 7/2003 | Rao et al. | |
| 6,970,512 B2 * | 11/2005 | Costa | H04N 21/23418 375/240.01 |
| 7,054,368 B2 | 5/2006 | Costa | |
| 7,054,369 B2 * | 5/2006 | Costa | H04N 21/23418 375/240.23 |
| 7,075,990 B2 * | 7/2006 | Costa | H04N 21/2343 348/419.1 |
| 7,450,644 B2 * | 11/2008 | Costa | H04N 21/2343 375/240.23 |
| 7,502,416 B2 | 3/2009 | Costa | |
| 8,218,647 B2 * | 7/2012 | Costa | H04N 21/23418 375/240.23 |
| 2002/0019966 A1 | 2/2002 | Yagil et al. | |
| 2002/0044603 A1 | 4/2002 | Rajagopalan et al. | |
| 2002/0078465 A1 | 6/2002 | Stahl et al. | |
| 2002/0129375 A1 | 9/2002 | Kim et al. | |
| 2002/0166120 A1 | 11/2002 | Boylan et al. | |
| 2003/0043915 A1 | 3/2003 | Costa et al. | |
| 2004/0103437 A1 | 5/2004 | Allegrezza et al. | |
| 2004/0111756 A1 | 6/2004 | Stuckman et al. | |
| 2005/0036763 A1 * | 2/2005 | Kato | G11B 27/034 386/241 |

\* cited by examiner

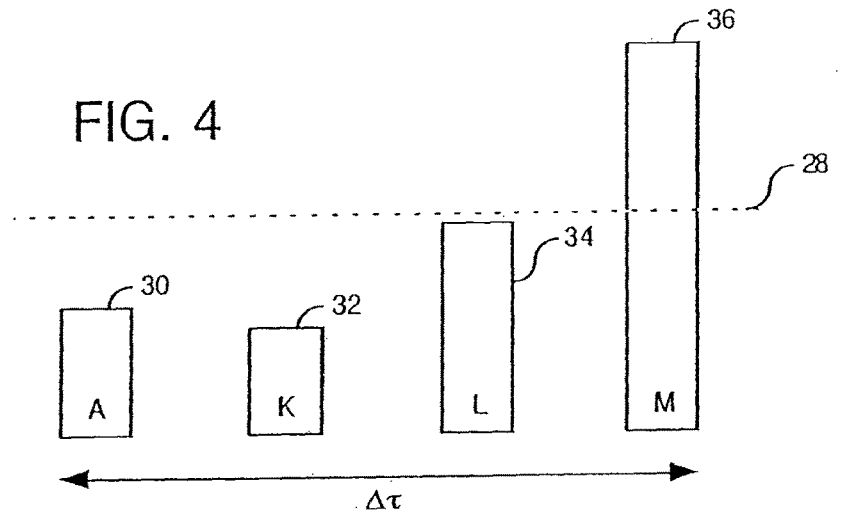
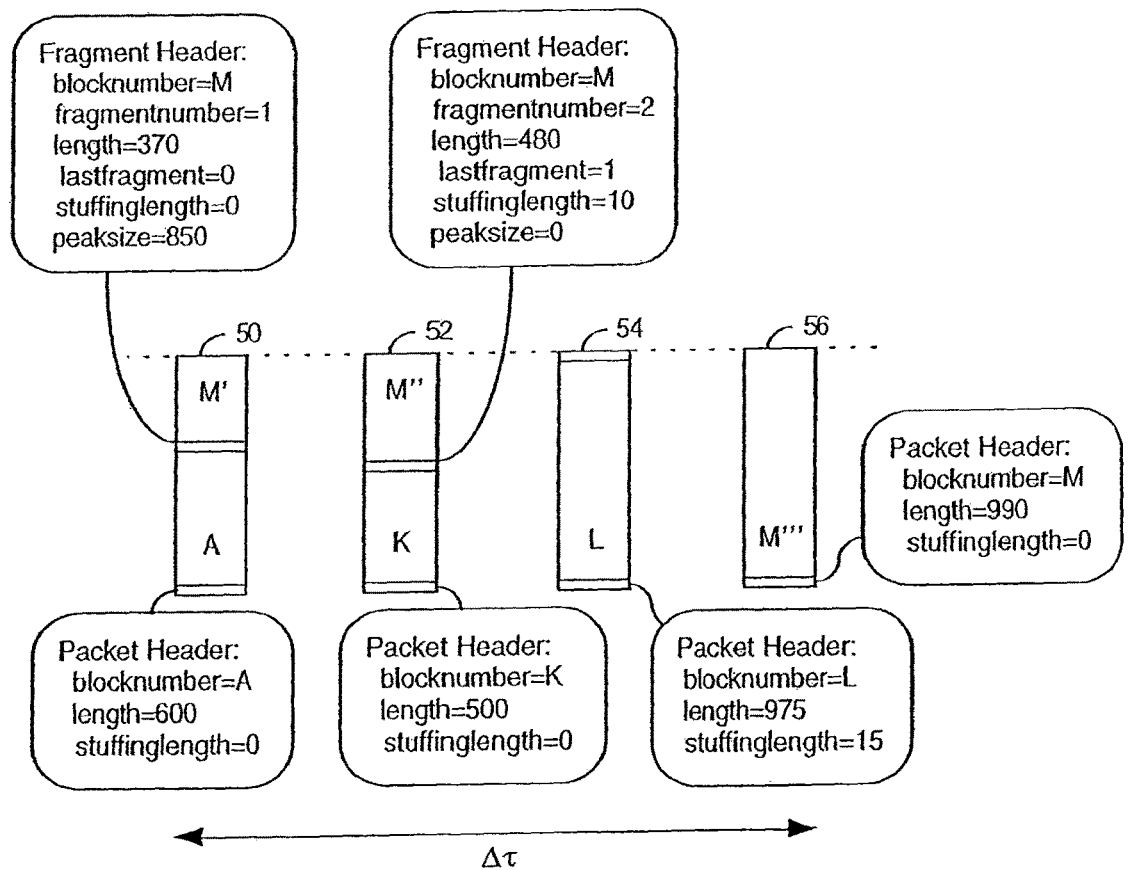

METHOD AND SYSTEM OF PROCESSING IMAGE SEQUENCES

CROSS-REFERENCE TO RELATED APPLICATION(S)

The present application is a continuation of and claims priority to U.S. patent application Ser. No. 14/485,284, filed Sep. 12, 2014, (now U.S. Pat. No. 9,294,804) which is a continuation of and claims priority to U.S. patent application Ser. No. 13/431,656, filed Mar. 27, 2012 (now U.S. Pat. No. 8,861,612), which is a continuation of and claims priority to U.S. patent application Ser. No. 12/268,228, filed Nov. 10, 2008 (now U.S. Pat. No. 8,165,218), which is a continuation of U.S. patent application Ser. No. 11/208,078, filed Aug. 19, 2005 (now U.S. Pat. No. 7,450,644), which is a continuation of U.S. patent application Ser. No. 10/346,727, filed Jan. 16, 2003 (now U.S. Pat. No. 7,075,990), the entirety of each being hereby incorporated by reference. U.S. patent application Ser. No. 13/431,656, filed Mar. 27, 2012 (now U.S. Pat. No. 8,861,612) is also a continuation in part of and claims priority to U.S. patent application Ser. No. 12/367,161, filed Feb. 6, 2009 (now U.S. Pat. No. 8,218,647), which is a continuation of U.S. patent application Ser. No. 11/394,753, filed Mar. 31, 2006 (now U.S. Pat. No. 7,539,249), which is a continuation of U.S. patent application Ser. No. 10/893,196, filed Jul. 16, 2004 (now U.S. Pat. No. 7,054,369), which is a Division of U.S. patent application Ser. No. 09/942,260 filed Aug. 28, 2001 (now U.S. Pat. No. 6,970,512).

FIELD OF THE DISCLOSURE

The present disclosure relates to methods and systems of processing image sequences.

BACKGROUND

Numerous compression schemes address the transport and reconstruction of motion images (e.g. video) for pseudo-real-time and non-real-time applications. Many of these schemes make use of buffers, especially at a receiving end of a communication network, for storing partial blocks of information which are pre-transmitted to the receiver. For pseudo-real-time applications, the buffer has a buffer length which is a function of a total amount of bits of information to be sent and a bandwidth available in the communication network. For non-real-time applications, part of the information, such as Discrete Cosine Transform (DCT) coefficients, is sent ahead of time, while the rest of the information is sent later and reconstructed in real time.

The Motion Pictures Experts Group 2 (MPEG2) compression standard makes use of motion compensation to reduce the data rate. Although the content is compressed at a certain bit rate, such as 1.5 Megabits per second (Mbps), the actual bandwidth used temporally varies. The temporal variation creates peaks and troughs in the bandwidth. For purposes of illustration and example, consider a hypothetical real-time transmission of compressed motion images which produces a bit rate versus time graph 10 shown in FIG. 1. The bit rate has an upper bound of 6.5 Mbps and is variable over time. In a DVD movie, for example, the bit rate may vary from 2.5 Mbps to 8 Mbps.

BRIEF DESCRIPTION OF THE DRAWINGS

The embodiments are pointed out with particularity in the appended claims. However, other features of the embodiments will become more apparent by referring to the following detailed description in conjunction with the accompanying drawings in which:

FIG. 4 is an example of four VBR packets within a time window $\Delta r$;

FIG. 5 is an example of four reformatted packets based on the four VBR packets in FIG. 4;

DETAILED DESCRIPTION

Disclosed herein are methods and systems that can improve, and optionally optimize, the video quality of live content on bandwidth-limited transmission links such as satellite links or other wireless links, and Asynchronous Digital Subscriber Line (ADSL) or other DSL links. By analyzing a time window of video content in advance of final coding, a constant bit rate (CBR) or a near-CBR type data stream can be constructed that encodes the time window of video content at a higher bit rate than existing coding schemes. While sending the CBR or near-CBR representation of the time window of video content, another time window of video content is analyzed to construct its CBR or near-CBR representation. By repeating this process for each time window of video content, a higher quality video delivery results on the same band-limited link.

Figure 2:
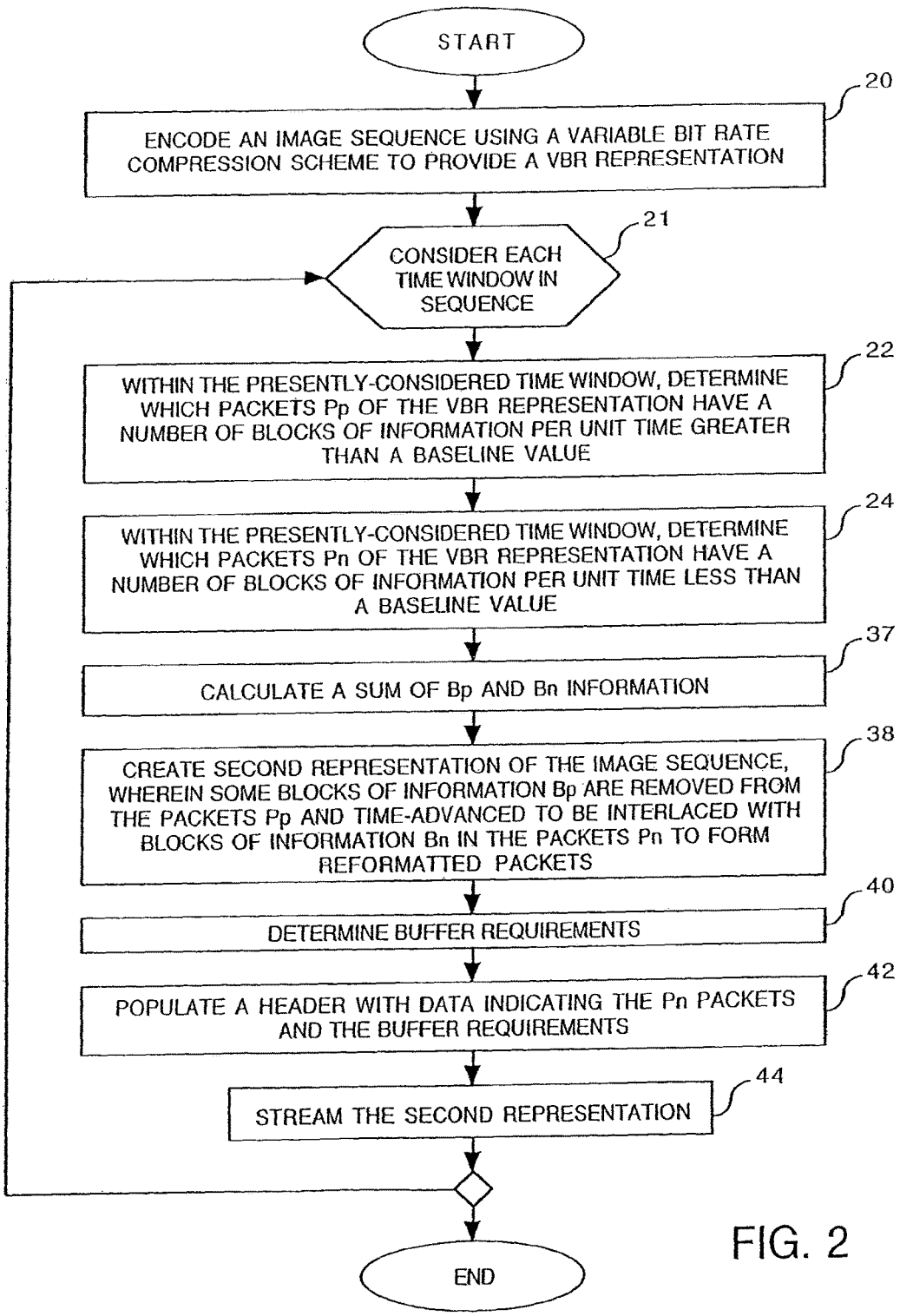
FIG. 2 is a flow chart of an embodiment of a method of improving the transport of compressed video data.

FIG. 2 is a flow chart of an embodiment of a method of improving the transport of compressed video data. As indicated by block 20, the method comprises encoding an image sequence to provide a variable bit rate (VBR) representation thereof. The image sequence may be live, such as a live sporting event, a live concert, or another live entertainment event, or a live telephony event such as video conferencing video. Alternatively, the image sequence may be stored, such as a movie, a music video, or educational video, in a storage medium.

The encoding may be based upon a pre-selected peak bit rate which the VBR representation is not to exceed and/or an average bit rate. The image sequence may be encoded in accordance with an MPEG compression standard such as MPEG2, for example. The resulting VBR representation comprises a plurality of packets containing blocks of information.

Figure 1:
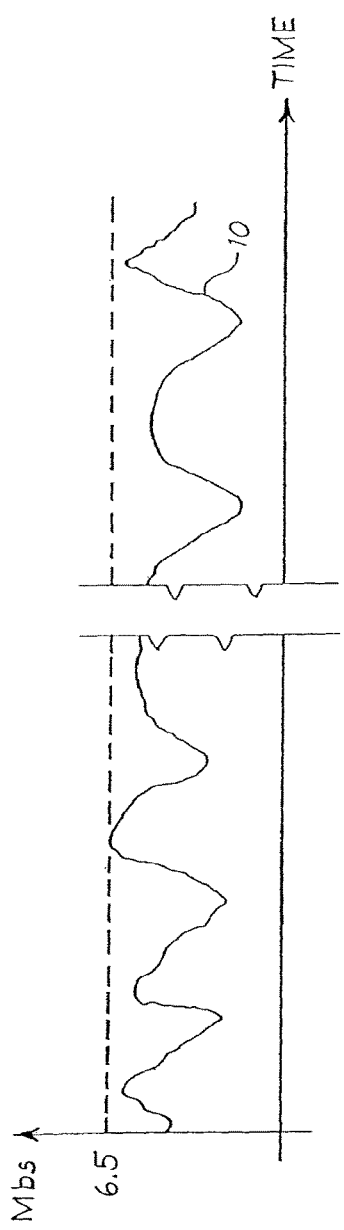
FIG. 1 is a graph of bit rate versus time for a hypothetical real-time transmission of compressed motion images.
Figure 3:
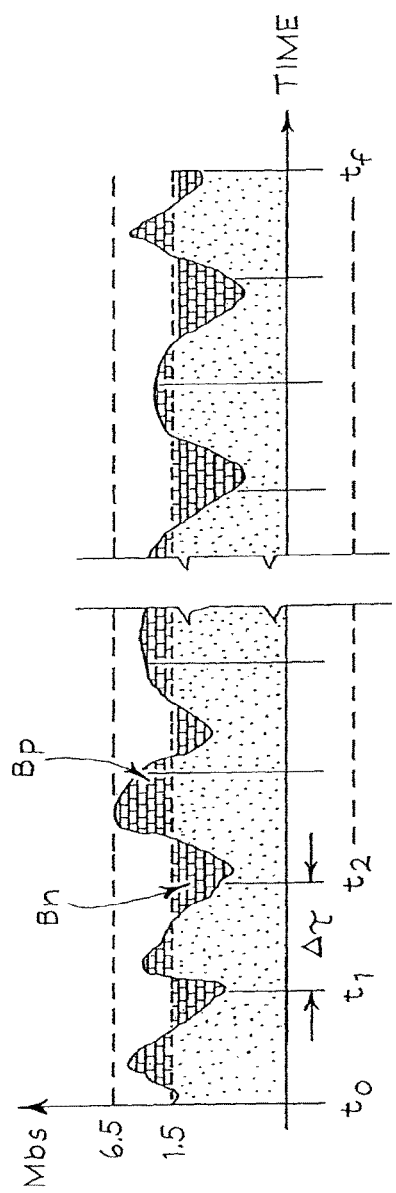
FIG. 3 illustrates a transmission curve of a VBR representation.

For purposes of illustration and example, consider the resulting VBR representation having a transmission curve given in FIG. 3. FIG. 3 illustrates the transmission curve in terms of blocks of information that are sent per unit time. The transmission curve can be considered from an energy perspective, wherein the power over a time segment is based on an integral of the transmission curve over the time segment. Further, the instantaneous value varies based on the amplitude of the curve at a point in time. During complex scenes with significant motion, the number of blocks of information is relatively high. In contrast, during periods of little or no motion, the number of blocks of information is relatively low. In this example, the VBR representation has an average bit rate of 1.5 Mbps but an actual link bit rate which varies to 6.5 Mbps.

The VBR representation is segmented into time intervals which start at times t0, t1, t2, tf. The time intervals define time windows within which the VBR representation is processed to form a CBR or near-CBR representation. Each of the time intervals may have the same duration ΔT, or may have different durations. For example, as described later herein, a time interval having a peak or near-peak bit rate portion of the VBR representation (i.e. one having a complex scene and/or significant motion) may have a greater duration than other time intervals.

Referring back to FIG. 2, each time window is considered in sequence as indicated by block 21. For the presently-considered time window, an analysis of block coding statistics (indicated by blocks 22 and 24) is performed for the VBR representation within the time window. In particular, block 22 indicates an act of determining which packet(s), denoted by Pp, of the VBR representation within the presently-considered time window have a number of blocks of information per unit time greater than a baseline value. Block 24 indicates an act of determining which packet(s), denoted by Pn, of the VBR representation within the presently-considered time window have a number of blocks of information per unit time less than the baseline value.

FIG. 4 is an example of four VBR packets within a time window Δτ. The baseline value is indicated by reference numeral 28. The baseline value 28 may be based on an average value for the entire curve in FIG. 3. The baseline value 28 represents the bit rate desired when the transmission rate has been chosen.

Within the time window ΔT, each of the first three packets (indicated by reference numerals 30, 32 and 34) has a number of blocks per unit time that is less than the baseline value 28, and thus are determined to be Pn packets. The last packet (indicated by reference numeral 36) has a number of blocks per unit time that is greater than the baseline value 28, and thus is determined to be a Pp packet.

In the context of this application, the variable Bp represents the equivalent block data that resides above the baseline value in a Pp packet. The variable Bn represents the equivalent block data that resides below the baseline value in a Pn packet. Block 37 in FIG. 2 indicates an act of calculating a sum of Bp and Bn information to ensure that ΣBn≥ΣBp for the presently considered time interval. Optionally, this act may include increasing the duration of the time interval to ensure that ΣBn≥ΣBp. For example, if ΣBn≥ΣBP in a time interval of length ΔT, the time interval may be extended to be 2 ΔT, or as many ΔT's needed to ensure that ΣBn≥ΣBp. As another option, the time window may have a duration such that ΣBn≥ΣBp, which provides an optimal condition for the present invention. Another act that may be performed if ΣBn≥ΣBp in the presently-considered time interval is to remove one or more frames from the image sequence so that ΣBn≥ΣBP.

An act of creating a second representation of the image sequence is performed as indicated by block 38. In the second representation, some blocks of information Bp are removed from the packets Pp, and time-advanced to be interlaced with blocks of information in the packets Pn to form reformatted packets. The reformatted packets have a reduced variation in a number of blocks of information per unit time from packet-to-packet. Preferably, the time-advanced Bp blocks are distributed into Pn packets so that the number of blocks of information per unit time in the second representation is about equal to the baseline value in all of the reformatted packets in the presently-considered time window. In an exemplary case, the second representation is a CBR representation in which the number of blocks of information per unit time in the second representation is equal to the baseline value in each of the reformatted packets in the presently-considered time window.

The acts described with reference to block 37 ensure that each of the reformatted packets has a size that is within an upper bound, and thus ensure that the CBR or near-CBR representation does not exceed a maximum bit rate.

As indicated by block 40, an act of determining buffer requirements needed at a receiver is performed. The buffer requirements are based on the maximum number of time-advanced blocks that need to be stored in the presently-considered time interval and a small overhead for headers. As indicated by block 42, an act of populating one or more headers in the second representation. The headers may include a packet header for each of the packets, and a fragment header for some or all of the Pn packets.

FIG. 5 is an example of four reformatted packets 50, 52, 54 and 56 based on the four VBR packets 30, 32, 34 and 36 in FIG. 4. Blocks of information are removed from the Pp packet 36 to form the reformatted packet 56. The blocks of information removed from the Pp packet 36 are interlaced with the Pn packets 30 and 32 to form the reformatted packets 50 and 52.

In one embodiment, each reformatted packet comprises all or part of an original VBR packet, and an associated packet header having block number data identifying the original VBR packet, length data indicating the length of the portion of the original VBR packet in the reformatted packet, and optional stuffing length data. Each reformatted packet having time-advanced blocks further comprises an associated fragment header having block number data identifying which original VBR packet is the source of the time-advanced blocks, fragment number data to identify the fragment, length data indicating the length of the time-advanced blocks in the reformatted packet, last fragment number data to indicate a sequence of the fragments, optional stuffing length data, and peak size data indicating how many time-advance bytes need to be buffered to reconstruct the VBR packets.

For example, the reformatted packet 50 comprises all of the original VBR packet 30, and an associated packet header having block number data identifying the original VBR packet 30, length data indicating that the length of the original VBR packet 30 is 600 bytes, and stuffing length data indicating a stuffing length of zero bytes. The reformatted packet 50 also comprises time-advanced blocks from a first portion of the original VBR packet 36, and an associated fragment header having block number data identifying the original VBR packet 36 as the source of the time-advanced blocks, fragment number data to identify this as a first fragment, length data indicating that the length of the time-advanced blocks is 370 bytes, last fragment number data to indicate that this is a first in a sequence of the fragments, stuffing length data indicating a stuffing length of zero, and peak size data indicating that 850 time-advance bytes need to be buffered. The reformatted packet 50 has a size of 1000 bytes (10 bytes in the packet header+600 VBR bytes+20 bytes in the fragment header+370 time-advanced bytes).

The reformatted packet 52 comprises all of the original VBR packet 32, and an associated packet header having block number data identifying the original VBR packet 32, length data indicating that the length of the original VBR packet 32 is 500 bytes, and stuffing length data indicating a stuffing length of zero bytes. The reformatted packet 52 also comprises time-advanced blocks from a second portion of the original VBR packet 36, and an associated fragment header having block number data identifying the original VBR packet 36 as the source of the time-advanced blocks, fragment number data to identify this as a second fragment, length data indicating that the length of the time-advanced blocks is 460 bytes, last fragment number data to indicate that this fragment is subsequent to the first fragment in the reformatted packet 50, stuffing length data indicating a stuffing length of 10 bytes, and peak size data of zero. The reformatted packet 52 has a size of 1000 bytes (10 bytes in the packet header+500 VBR bytes+20 bytes in the fragment header+460 time-advanced bytes+10 stuffing bytes).

The reformatted packet 54 comprises all of the original VBR packet 34, and an associated packet header having block number data identifying the original VBR packet 34, length data indicating that the length of the original VBR packet 34 is 975 bytes, and stuffing length data indicating a stuffing length of 15 bytes. The reformatted packet 54 is absent any time-advanced blocks. The reformatted packet 54 has a size of 1000 bytes (10 bytes in the packet header+975 VBR bytes+15 stuffing bytes).

The reformatted packet 56 comprises a third portion of the original VBR packet 36, and an associated packet header having block number data identifying the original VBR packet 36, length data indicating that the length of the third portion of the original VBR packet 36 is 990 bytes, and stuffing length data indicating a stuffing length of zero bytes. The reformatted packet 56 is absent any time-advanced blocks. The reformatted packet 54 has a size of 1000 bytes (10 bytes in the packet header+990 VBR bytes).

It is noted that the number of bytes assigned to each portion of the reformatted packets in the above example is given for purposes of illustration, and that different numbers of bytes may be used in practice.

As indicated by block 64 in FIG. 2, an act of streaming the second representation of the image sequence via a communication network is performed. Flow of the method returns back to block 21, wherein the next time window of the image sequence is considered to form a second representation. The result of sequentially considering the time windows is a data stream that provides a CBR or near-CBR representation of the image sequence. The resulting stream may be a CBR or near-CBR stream which conforms to the link rate of 1.5 Mbps, but in essence contains coded video at a higher rate, such as 2.0 Mbps for example.

It is noted some sequentially-depicted acts performed in FIG. 2 may be performed concurrently. For example, while streaming the CBR or near-CBR representation of the time window of video content, another time window of video content may be analyzed to construct its CBR or near-CBR representation.

Figure 6:
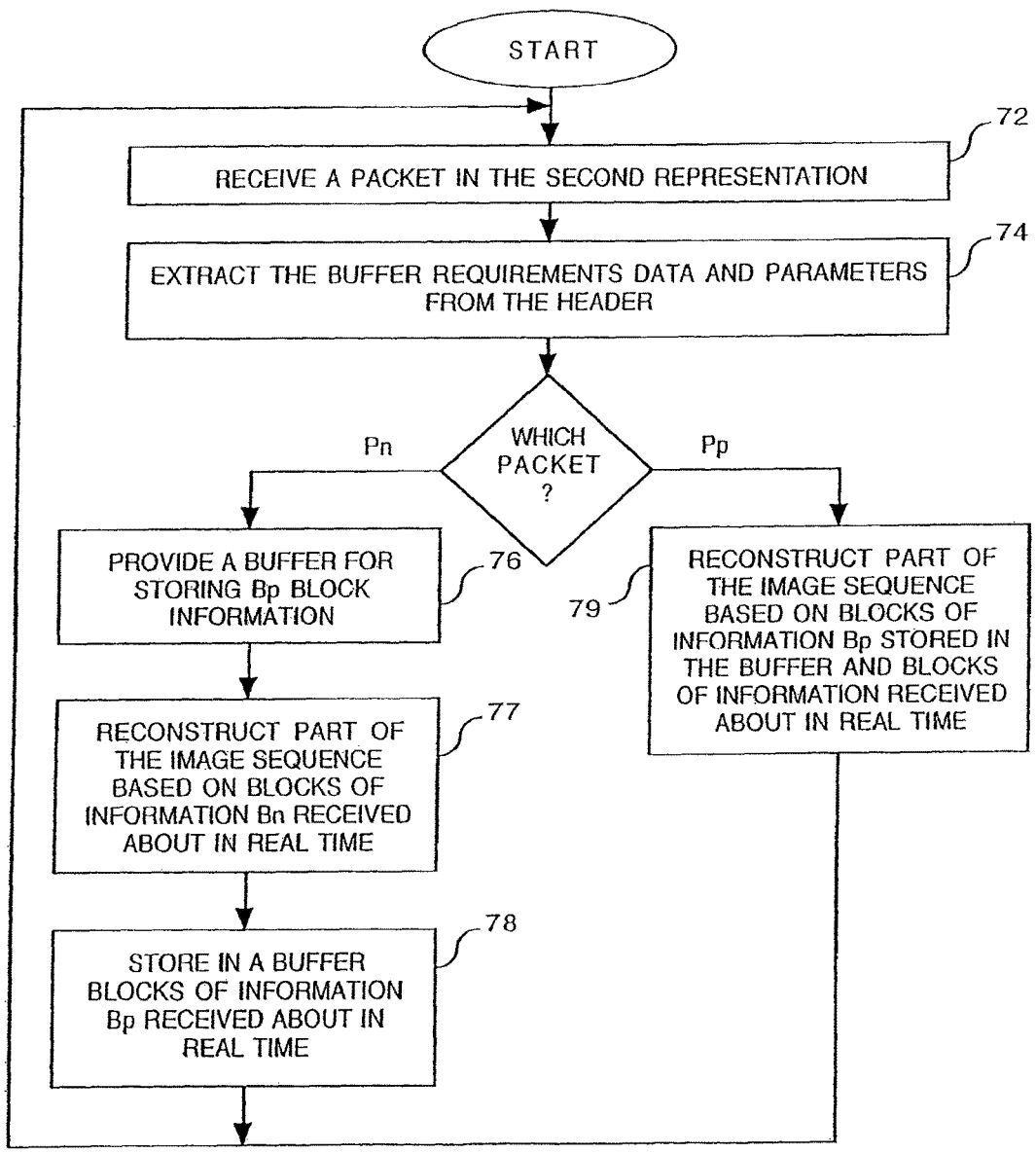
FIG. 6 is a flow chart of an embodiment of a method performed at a receiver.

FIG. 6 is a flow chart of an embodiment of a method performed at a receiver. As indicated by block 72, the method comprises receiving one or more packets in second representation of the image sequence via the communication network. As indicated by block 74, the buffer requirement data and other parameters are extracted from the header.

Frames of the image sequence are reconstructed concurrently with the second representation being received. For the packets Pn, a buffer is provided for storing Bp block information based on the buffer requirement data (block 76). Preferably, the buffer comprises a content addressable memory (CAM) type buffer. Further for the packets Pn, frames of the image sequence are reconstructed based on blocks of information received about in real time (block 77). Still further for the packets Pn, the blocks of information Bp which are received are stored in the buffer (block 78). For the packets Pp, frames of the image sequence are reconstructed based on the blocks of information Bp stored in the buffer and blocks of information received about in real time (block 79).

As used herein, the phrase "about in real time" contemplates any processing and/or storage delays which may result in a non-strict real time reconstruction of the frames. Thus, the frames of the image sequence are reconstructed concurrently with the reception of the second representation either strictly in real time or non-strictly in real time.

Figure 7:
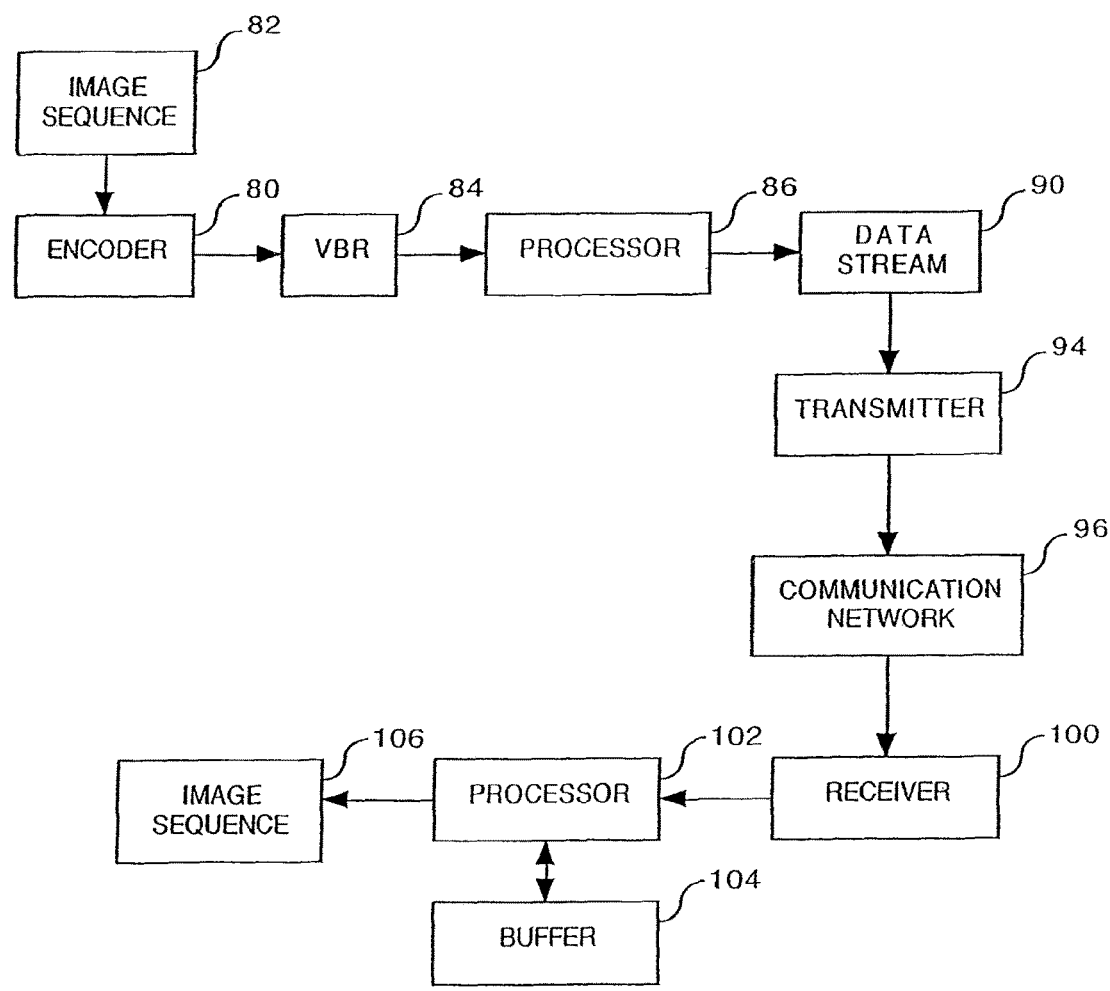
FIG. 7 is a block diagram of an embodiment of a system to perform the herein-disclosed methods.

FIG. 7 is a block diagram of an embodiment of a system to perform the herein-disclosed methods. An encoder 80 encodes an image sequence 82 to provide a VBR representation 84. A processor 86 performs the block coding statistics analysis of the VBR representation 84 as described with reference to FIG. 2.

The processor 86 outputs a data stream 90 that contains a representation of the image sequence 82 in which some blocks of information Bp are removed from the packets Pp and time-advanced to be interlaced with blocks of information in the packets Pn to reduce a variation in a number of blocks of information per unit time between the packets Pp and Pn. A transmitter 94 transmits the data stream 90 via a communication network 96.

The system comprises a receiver 100 to receive the data stream 90 via the communication network 96. A processor 102 is responsive to the receiver 100 to reconstruct frames of the image sequence concurrently with the reception of the data stream 90. For the packets Pn, the processor 102 reconstructs frames of the image sequence based on blocks of information received about in real time. Further for the packets Pn, the processor 102 stores the blocks of information Bp in a buffer 104. For the packets Pp, the processor 102 reconstructs frames of the image sequence based on the blocks of information Bp stored in the buffer 104 and blocks of information received about in real time. Reconstructed frames of the image sequence are indicated by reference numeral 106.

The acts performed by the processor 86 may be directed by computer-readable program code stored by a computer-readable medium. Similarly, the acts performed by the processor 102 may be directed by computer-readable program code stored by a computer-readable medium.

The components at the transmitter end may be embodied by a video server, a general purpose personal computer, or a video telephony device, for example. The components at the receiving end may be embodied by a general purpose personal computer, a set-top box, a television receiver, or a video telephony device, for example.

Preferred embodiments of a method and system to improve the transport of compressed video data have been described herein. The embodiments disclosed herein facilitate higher bit rate content to be transmitted over the same band-limited transmission link. Making use of MPEG2 block structure and block sequence reduces the computational complexity of the scheme and is well suited to CAM-oriented silicon solutions.

The value of $\Delta r$ may be selected with consideration to its resulting delay (which degrades as $\Delta r$ increases) and its resulting ability to time-advance all Bp blocks (which improves as $\Delta r$ increases). In some applications, $\Delta T$ may be selected to be about one or two seconds. In other applications, $\Delta T$ may be selected to be from ten to twenty seconds. For two-way video applications, such as two-way video/audio communications, $\Delta T$ should be relatively small. Frames can be skipped in time intervals in which the relatively small $\Delta T$ results in an inability to time-advance all Bp blocks. For video-on-demand applications, $\Delta T$ should be larger to ensure that all Bp blocks can be time-advanced, and thus to ensure that no frames need to be skipped. A locally-held message, such as "your movie is now being downloaded", and/or an advertisement can be displayed in the period of time needed to process the first ΔT in video-on-demand applications.

It is noted that the herein-disclosed way that packets are segmented, combined with advanced packets, and the packet header format may be applied to embodiments for VBR-to-CBR or near-CBR conversion disclosed in application Ser. No. 09/942,260. With this combination, only a single time window that includes the entire image sequence is processed in accordance with the present application.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    segmenting, by a processing system comprising a processor, a variable bit rate representation of an image into a first plurality of packets and a second plurality of packets, wherein the first plurality of packets spans a first time interval, wherein the second plurality of packets spans a second time interval, and wherein a first amount of time corresponding to the first time interval is different than a second amount of time corresponding to the second time interval;
    identifying, by the processing system, a first packet of the first plurality of packets, wherein the first packet includes a first number of blocks of information greater than a baseline value;
    removing, by the processing system, a group of blocks from the first number of blocks of information from the first packet, wherein a remaining group of blocks from the first number of blocks is less than the baselines value;
    identifying, by the processing system, a second packet and a third packet from the first plurality of packets, wherein the second packet includes a second number of blocks of information less than the baseline value, and wherein the third packet includes a third number of blocks of information less than the baseline value;
    adding, by the processing system, a first portion of the group of blocks to the second packet resulting in an adjusted second number of blocks of information and adding a second portion of the group of blocks to the third packet resulting in an adjusted third number of blocks of information, wherein the adjusted second number of blocks is less than the baseline value and the adjusted third number of blocks is less than the baseline value; and
    creating, by the processing system, a second representation of the variable bit rate representation based on the removing of the group of blocks from the first packet and the adding of the first portion of the group of the blocks to the second packet and adding the second portion of the group of blocks to the third packet to cause a first size of the first packet, a second size of the second packet, and a third size of the third packet to be within an upper bound after creating the second representation, wherein each packet of the second representation comprises reconstruction information to describe a reconstruction of the variable bit rate representation from the second representation; and
    streaming, by the processing system, the second representation of the variable bit rate representation to a device.

2. The method of claim 1, wherein the second representation of the variable bit rate representation that is streamed provides an approximately constant bit rate representation of image date to the device.

3. The method of claim 1, wherein the reconstruction information comprises block number data identifying an original packet of the group of blocks that are removed from the first packet.

4. The method of claim 1, wherein the reconstruction information comprises fragment number data to identify the group of blocks that are removed from the first packet.

5. The method of claim 1, wherein the reconstruction information comprises length data indicating a length of the group of blocks that are removed from the first packet.

6. The method of claim 1, wherein the reconstruction information comprises last fragment number data to indicate a sequence of the group of blocks that are removed from the first packet.

7. The method of claim 1, wherein the reconstruction information comprises optional stuffing length data for the group of blocks that are removed from the first packet.

8. The method of claim 1, wherein the reconstruction information comprises peak size data indicating how many time-advance bytes are need to be buffered to reconstruct the variable bit rate representation.

9. The method of claim 1, wherein, after creating the second representation, the first packet and the second packet comprise a same number of blocks of information.

10. The method of claim 1, wherein the device that receives the second representation reconstructs frames of the variable bit rate representation from the second representation.

11. The method of claim 10, wherein the device that receives the second representation performs reconstructions of frames of the variable bit rate representation based on reconstruction information and blocks of information received in real time.

12. A method, comprising:
    segmenting, by a processing system including a processor, a variable bit rate representation of an image into a first plurality of packets and a second plurality of packets, wherein the first plurality of packets spans a first time interval, wherein the second plurality of packets spans a second time interval, and wherein a first amount of time corresponding to the first time interval is different than a second amount of time corresponding to the second time interval;

identifying, by the processing system, a first packet of the first plurality of packets, wherein the first packet includes a first number of blocks of information greater than a baseline value;

removing, by the processing system, a group of blocks from the first number of blocks of information from the first packet, wherein a remaining group of blocks from the first number of blocks is less than the baselines value;

identifying, by the processing system, a second packet and a third packet from the first plurality of packets, wherein the second packet includes a second number of blocks of information less than the baseline value, and wherein the third packet includes a third number of blocks of information less than the baseline value;

adding, by the processing system, a first portion of the group of blocks to the second packet resulting in an adjusted second number of blocks of information and adding a second portion of the group of blocks to the third packet resulting in an adjusted third number of blocks of information, wherein the adjusted second number of blocks is less than the baseline value and the adjusted third number of blocks is less than the baseline value; and creating, by the processing system, a second representation of the variable bit rate representation based on the removing of the group of blocks from the first packet and the adding of the first portion of the group of the blocks to the second packet and adding the second portion of the group of blocks to the third packet to cause a first size of the first packet, a second size of the second packet, and a third size of the third packet to be within an upper bound after creating the second representation.

13. The method of claim 12, wherein each packet of the second representation comprises reconstruction information to describe a reconstruction of the variable bit rate representation from the second representation, wherein the reconstruction information comprises peak size data indicating how many time-advance bytes are need to be buffered to reconstruct the variable bit rate representation.

14. A non-transitory computer-readable storage medium, comprising executable instructions that, when executed by a processing system including a processor, facilitate performance of operations, comprising:

segmenting a variable bit rate representation of an image into a first plurality of packets and a second plurality of packets, wherein the first plurality of packets spans a first time interval, wherein the second plurality of packets spans a second time interval, and wherein a first amount of time corresponding to the first time interval is different than a second amount of time corresponding to the second time interval;

identifying a first packet of the first plurality of packets, wherein the first packet includes a first number of blocks of information greater than a baseline value;

removing a group of blocks from the first number of blocks of information from the first packet, wherein a remaining group of blocks from the first number of blocks is less than the baselines value;

identifying a second packet and a third packet from the first plurality of packets, wherein the second packet includes a second number of blocks of information less than the baseline value, and wherein the third packet includes a third number of blocks of information less than the baseline value;

adding a first portion of the group of blocks to the second packet resulting in an adjusted second number of blocks of information and adding a second portion of the group of blocks to the third packet resulting in an adjusted third number of blocks of information, wherein the adjusted second number of blocks is less than the baseline value and the adjusted third number of blocks is less than the baseline value; and creating a second representation of the variable bit rate representation based on the removing of the group of blocks from the first packet and the adding of the first portion of the group of the blocks to the second packet and adding the second portion of the group of blocks to the third packet to cause a first size of the first packet, a second size of the second packet, and a third size of the third packet to be within an upper bound after creating the second representation; and streaming the second representation of the variable bit rate representation to a device.

15. The non-transitory computer-readable storage medium of claim 14, wherein each packet of the second representation comprises reconstruction information to describe a reconstruction of the variable bit rate representation from the second representation.

16. The non-transitory computer-readable storage medium of claim 15, wherein the second representation of the variable bit rate representation that is streamed provides an approximately constant bit rate representation of image date to the device.

17. The non-transitory computer-readable storage medium of claim 15, wherein the reconstruction information comprises block number data identifying an original packet of the group of blocks that are removed from the first packet.

18. The non-transitory computer-readable storage medium of claim 15, wherein the reconstruction information comprises fragment number data to identify the group of blocks that are removed from the first packet.

19. The non-transitory computer-readable storage medium of claim 15, wherein the reconstruction information comprises length data indicating a length of the group of blocks that are removed from the first packet.

20. The non-transitory computer-readable storage medium of claim 15, wherein the reconstruction information comprises last fragment number data to indicate a sequence of the group of blocks that are removed from the first packet, and wherein the reconstruction information comprises peak size data indicating how many time-advance bytes are need to be buffered to reconstruct the variable bit rate representation.

* * * * *